US00RE47827E

(19) United States
(12) Reissued Patent
Ishida

(10) Patent Number: US RE47,827 E
(45) Date of Reissued Patent: *Jan. 28, 2020

(54) IMAGE FORMING APPARATUS INCLUDING A RECESSED HANDLE PORTION FOR AN EXTENSION PORTION

(71) Applicant: FUJI XEROX CO., LTD.

(72) Inventor: Mitsuyuki Ishida, Yokohama (JP)

(73) Assignee: FUJI XEROX CO., LTD., Minato-ku, Tokyo (JP)

( * ) Notice: This patent is subject to a terminal disclaimer.

(21) Appl. No.: 15/795,583

(22) Filed: Oct. 27, 2017

Related U.S. Patent Documents

Reissue of:
(64) Patent No.: 8,672,429
Issued: Mar. 18, 2014
Appl. No.: 13/036,213
Filed: Feb. 28, 2011

U.S. Applications:
(63) Continuation of application No. 14/318,110, filed on Jul. 18, 2014, now Pat. No. Re. 46,620, which is an application for the reissue of Pat. No. 8,672,429.

(30) Foreign Application Priority Data

Sep. 24, 2010 (JP) ..... 2010-213241

(51) Int. Cl.
*B41J 13/10* (2006.01)
*B65H 31/02* (2006.01)
(Continued)

(52) U.S. Cl.
CPC ..... *B41J 13/106* (2013.01); *B65H 29/70* (2013.01); *B65H 31/02* (2013.01); *G03G 15/6552* (2013.01)

(58) Field of Classification Search
CPC ..... G03G 15/6552; G03G 21/1695; G03G 2215/00421; B65H 2405/11161;
(Continued)

(56) References Cited

U.S. PATENT DOCUMENTS 5,746,528 A * 5/1998 Mayer et al. ..... 400/625
5,794,103 A * 8/1998 Oh ..... 399/119
(Continued)

FOREIGN PATENT DOCUMENTS

CN 1636756 A 7/2005
CN 1663809 A 9/2005
(Continued)

OTHER PUBLICATIONS

Communication dated Dec. 29, 2017, issued by the State Intellectual Property Office of the People's Republic of China in counterpart Application No. 201510645438.X.
(Continued)

*Primary Examiner* — William C Doerrler
(74) *Attorney, Agent, or Firm* — Sughrue Mion, PLLC

(57) ABSTRACT

An image forming apparatus includes an output unit to which a recording medium on which an image has been formed is output, the output unit including an output unit body, and an extension portion that is disposed on the output unit body so as to be extendable from the output unit body in an output direction of the recording medium, the extension portion including a handle portion that is recessed in a direction away from a back surface of the recording sheet so as allow a finger to be hooked in a direction in which the extension portion is extended in the output direction of the recording medium, the back surface being a surface that is in contact with the output unit body, and a protrusion that protrudes toward the back surface of the recording medium from the extension portion.

4 Claims, 9 Drawing Sheets

(51) Int. Cl.
*G03G 15/00* (2006.01)
*B65H 29/70* (2006.01)

(58) Field of Classification Search
CPC .. B65H 2405/11164; B65H 2405/1122; B65H 2405/141; B65H 31/20
USPC ..... 312/223.1; 399/107, 405
See application file for complete search history.

(56) References Cited

U.S. PATENT DOCUMENTS

| | | | | |
|---|---|---|---|---|
| 6,053,493 | A * | 4/2000 | Yokoyama et al. | 271/171 |
| 6,089,772 | A | 7/2000 | Takemura et al. | |
| 6,106,173 | A | 8/2000 | Chiu | |
| 6,106,178 | A * | 8/2000 | Chiu | 400/624 |
| 6,276,852 | B1 * | 8/2001 | Osmus | 400/624 |
| 6,287,032 | B1 * | 9/2001 | Osmus et al. | B41J 11/006 400/624 |
| 7,062,216 | B2 * | 6/2006 | Nobe et al. | 399/391 |
| 7,099,618 | B2 * | 8/2006 | Iwago et al. | G03G 15/60 399/367 |
| 7,268,769 | B2 * | 9/2007 | Kogoh et al. | 345/168 |
| 7,290,952 | B2 | 11/2007 | Kagami | |
| 7,413,183 | B2 | 8/2008 | Asada et al. | |
| 7,437,119 | B2 * | 10/2008 | Takemoto et al. | 399/393 |
| 7,748,705 | B2 | 7/2010 | Yamada | |
| 8,172,222 | B2 | 5/2012 | Yoda et al. | |
| 2005/0052518 | A1 * | 3/2005 | Kagami | B41J 13/106 347/104 |
| 2005/0196212 | A1 | 9/2005 | Takemoto et al. | |
| 2005/0280684 | A1 * | 12/2005 | Kawakami et al. | 347/104 |
| 2006/0001209 | A1 * | 1/2006 | Takagi | B65H 31/02 271/3.14 |
| 2006/0018693 | A1 * | 1/2006 | Nobe et al. | 399/405 |
| 2006/0049575 | A1 * | 3/2006 | Funk et al. | 271/207 |
| 2006/0204269 | A1 * | 9/2006 | Nagata et al. | 399/82 |
| 2006/0210337 | A1 * | 9/2006 | Nagata et al. | G03G 15/50 399/407 |
| 2007/0201923 | A1 * | 8/2007 | Asada et al. | 399/405 |
| 2008/0304886 | A1 * | 12/2008 | Nobe et al. | 399/405 |
| 2009/0085279 | A1 * | 4/2009 | Wakakusa et al. | 271/145 |
| 2009/0116889 | A1 * | 5/2009 | Ishii | 399/405 |
| 2009/0121414 | A1 * | 5/2009 | Ito | 271/209 |
| 2009/0206539 | A1 | 8/2009 | Takeuchi et al. | |
| 2009/0224463 | A1 * | 9/2009 | Chinzei | B65H 31/02 271/207 |
| 2009/0226230 | A1 | 9/2009 | Ohkawa | |
| 2009/0267233 | A1 | 10/2009 | Mizuguchi | |
| 2009/0267283 | A1 * | 10/2009 | Mizuguchi | 271/3.14 |
| 2010/0124449 | A1 * | 5/2010 | Asada et al. | 399/393 |
| 2010/0166473 | A1 * | 7/2010 | Asada et al. | 399/405 |
| 2011/0278789 | A1 * | 11/2011 | Otani | B65H 31/20 271/207 |

FOREIGN PATENT DOCUMENTS

| | | | |
|---|---|---|---|
| CN | 101397101 | A | 4/2009 |
| CN | 101497403 | A | 8/2009 |
| JP | 10-25051 | A | 1/1998 |
| JP | 10025051 | A * | 1/1998 |
| JP | 2003-40513 | A | 2/2003 |
| JP | 2005-255350 | A | 9/2005 |
| JP | 2006-219304 | A | 8/2006 |
| TW | 510863 | B | 11/2002 |

OTHER PUBLICATIONS

Communication dated Dec. 29, 2017, issued by the State Intellectual Property Office of the People's Republic of China in counterpart Application No. 201510646567.0.

Communication dated Jun. 29, 2018, from the State Intellectual Property Office of People's Republic of China in counterpart Application No. 201510645438.X.

Communication dated Apr. 17, 2017, from the State Intellectual Property Office of People's Republic of China in counterpart Application No. 201510646567.0.

Communication dated Apr. 17, 2017, from the State Intellectual Property Office of People's Republic of China in counterpart Application No. 201510645438.X.

Communication dated Jul. 1, 2016 from the State intellectual Property Office of the P.R.C. in counterpart Application No. 201510239824.9.

Communication dated Jul. 5, 2016 from the State intellectual Property Office of the P.R.C. In counterpart Application No. 201510239821.5.

* cited by examiner

IMAGE FORMING APPARATUS INCLUDING A RECESSED HANDLE PORTION FOR AN EXTENSION PORTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 8,672,429. The reissue applications are the present application, application Ser. No. 15/134,635 (now U.S. Reissue Pat. No. RE46,524), and application Ser. No. 14/318,110. Application Ser. No. 14/318,110 is a reissue application of U.S. Pat. No. 8,672,429. Application Ser. No. 15/134,635 is a continuation reissue of application Ser. No. 14/318,110. The present application is a continuation reissue of application Ser. No. 14/318,110.*

CROSS-REFERENCE TO RELATED APPLICATIONS

This application is based on and claims priority under 35 USC 119 from Japanese Patent Application No. 2010-213241 filed Sep. 24, 2010.

BACKGROUND

Technical Field

The present invention relates to an image forming apparatus.

SUMMARY

According to an aspect of the invention, an image forming apparatus includes an output unit to which a recording medium on which an image has been formed is output, the output unit including an output unit body, and an extension portion that is disposed on the output unit body so as to be extendable from the output unit body in an output direction of the recording medium, the extension portion including a handle portion that is recessed in a direction away from a back surface of the recording sheet so as allow a finger to be hooked in a direction in which the extension portion is extended in the output direction of the recording medium, the back surface being a surface that is in contact with the output unit body, and a protrusion that protrudes toward the back surface of the recording medium from the extension portion.

BRIEF DESCRIPTION OF THE DRAWINGS

An exemplary embodiment of the present invention will be described in detail based on the following figures, wherein:

FIGS. 8A and 8B illustrate how output unit illustrated in FIG. 7 supports sheets, in which FIG. 8A is a left side view illustrating how the output unit supports the sheets when the downstream ends of the sheets in the sheet output direction are on the upstream side of an end of an extension portion with respect to the sheet output direction, and FIG. 8B is a left side view illustrating how the output unit supports the sheets when the downstream ends of the sheets in the sheet output direction are on the downstream side of the end of the extension portion with respect to the sheet output direction.

DETAILED DESCRIPTION

Hereinafter, an exemplary embodiment of the present invention will be described with reference to the drawings.

Figure 1:
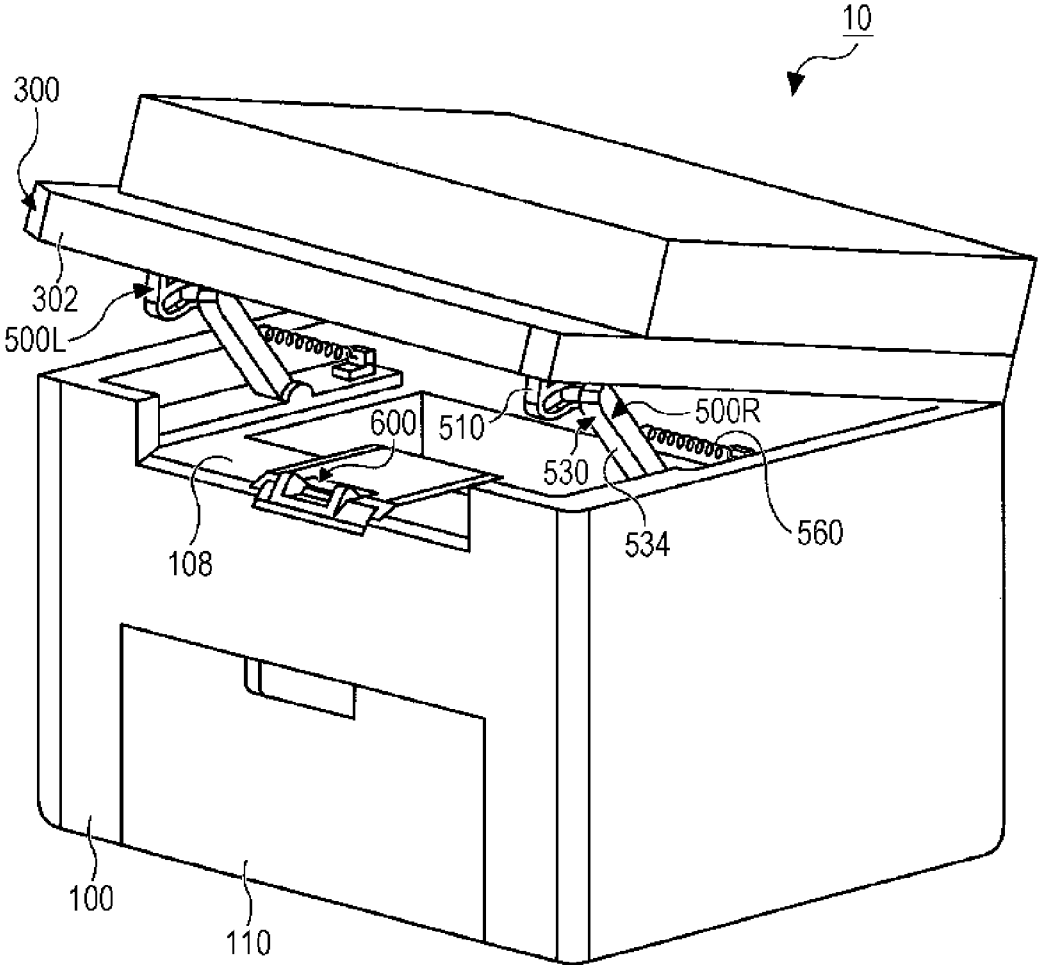
FIG. 1 is a perspective view of an image forming apparatus according to the exemplary embodiment of the present invention.
Figure 2:
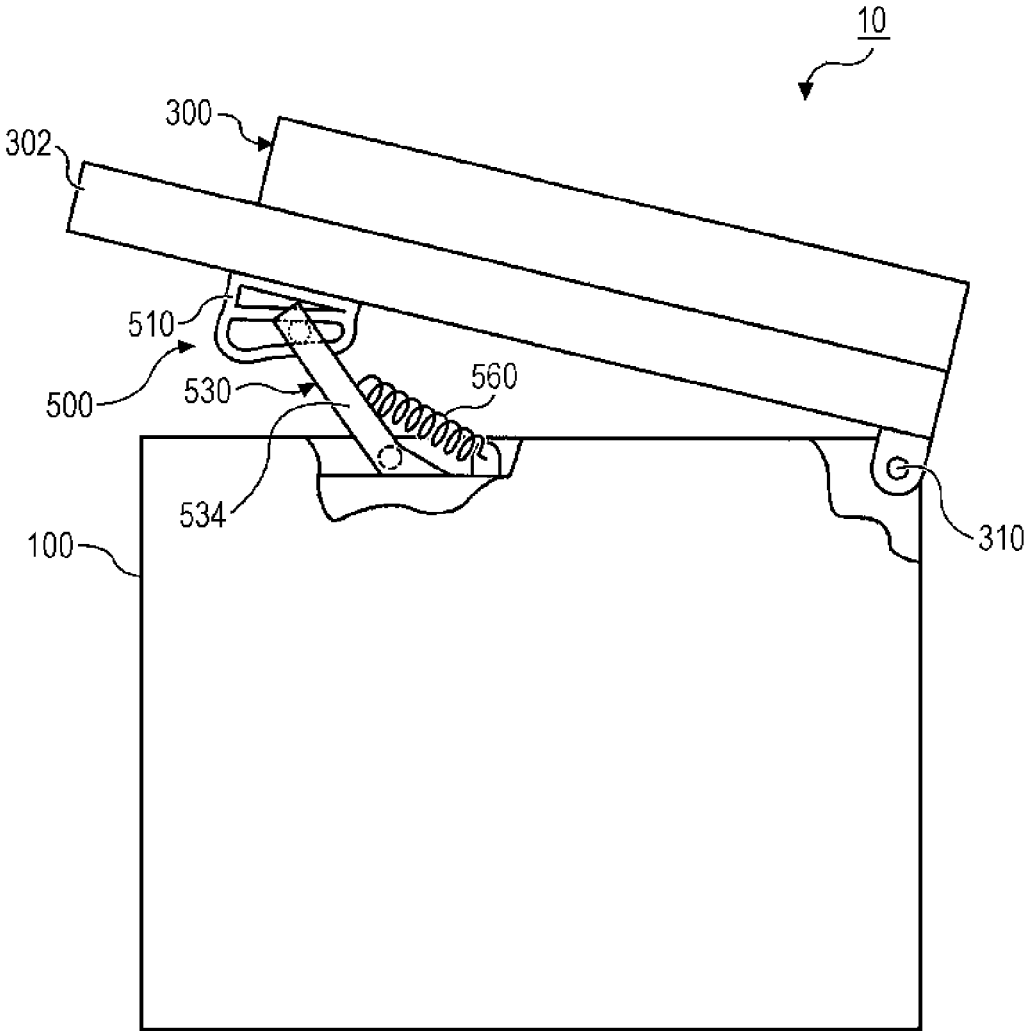
FIG. 2 is a cutaway view of the image forming apparatus of FIG. 1, which is viewed from the right side.
Figure 3:
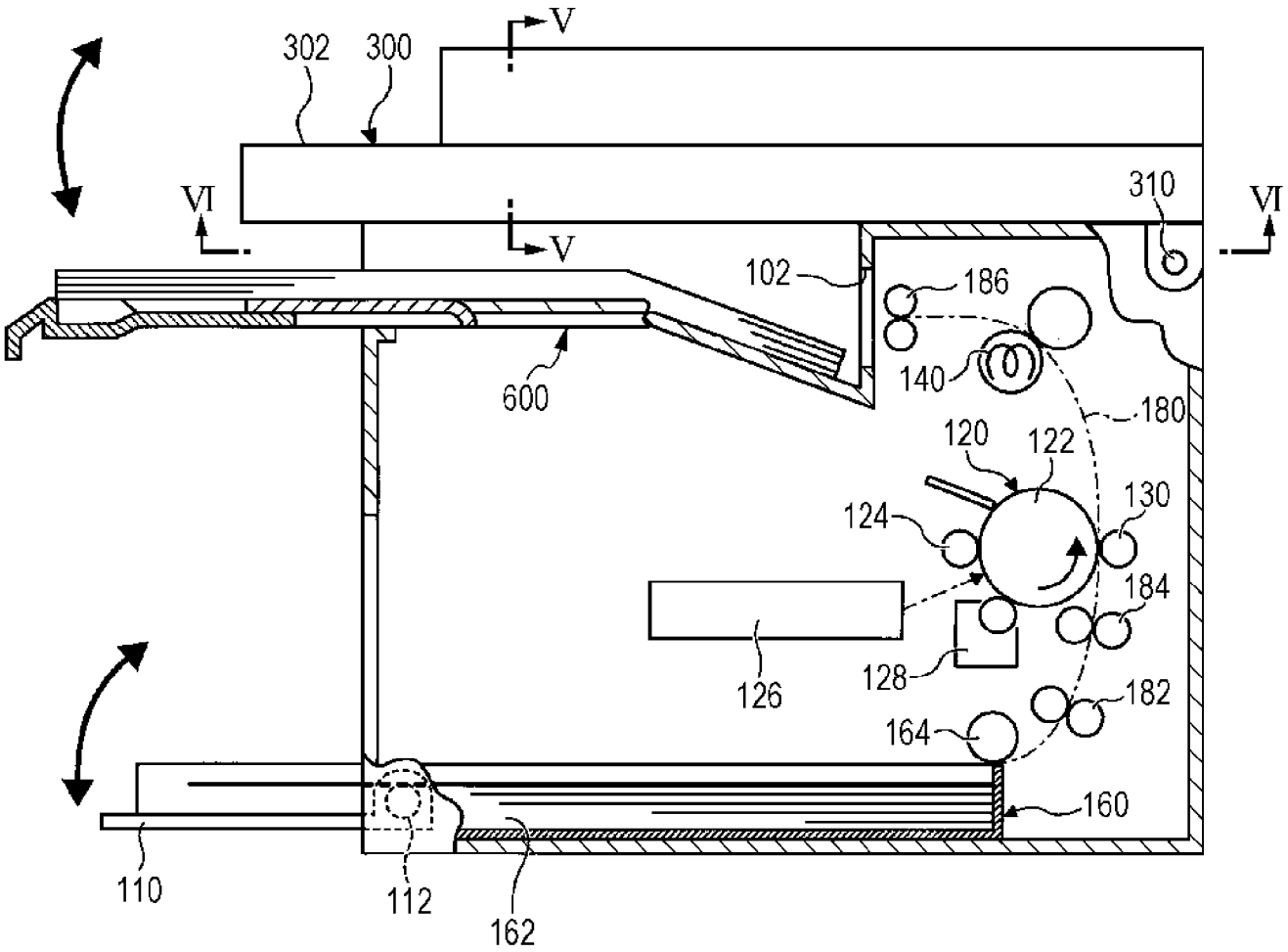
FIG. 3 is a sectional view of the image forming apparatus of FIG. 1, which is viewed from the right side.

FIGS. 1 to 3 illustrate an image forming apparatus 10 according to the exemplary embodiment of the present invention. As illustrated in FIGS. 1 to 3, the image forming apparatus 10 includes an image forming apparatus body 100, a document reading device 300, and dampers 500R and 500L. The image forming apparatus body 100 is used as a first structure. The document reading device 300 is used as a second structure and as a supported member.

A surface 108 on the upper side of the image forming apparatus body 100 is used as a part of an output unit 600. Sheets that are used as recording media and on which images have been formed are output to the output unit 600. A sheet feeder cover 110 is disposed on the front side of the image forming apparatus body 100. The sheet feeder cover 110 is attached to the image forming apparatus body 100 so as to be openable by using a hinge 112. FIG. 1 illustrates a state in which the sheet feeder cover 110 is closed relative to the image forming apparatus body 100. FIG. 3 illustrates a state in which the sheet feeder cover 110 is open relative to the image forming apparatus body 100. An output slot 102 is formed in the image forming apparatus body 100, and a sheet on which an image has been formed is output through the output slot 102.

An image forming unit 120 and a sheet feeder 160 are disposed in the image forming apparatus body 100. A transport path 180 is formed in the image forming apparatus body 100. The image forming unit 120 includes a photoconductor drum 122, a charging device 124, a latent image forming device 126, a developing device 128, a transfer device 130, and a fixing unit 140. The photoconductor drum 122 is used as an image carrier. The charging device 124 charges a surface of the photoconductor drum 122. The latent image forming device 126 forms a latent image on the surface of the photoconductor drum 122 by irradiating the surface of the photoconductor drum 122 charged by the charging device 124. The developing device 128 develops the latent image, which has been formed on the surface of the photoconductor drum 122 by the latent image forming device 126, by using developer. The transfer device 130 transfers a developer image, which has been formed on the surface of the photoconductor drum 122 by the developing device 128, to a sheet. The fixing unit 140 fixes the developer image, which has been transferred to the sheet by the transfer device 130, onto the sheet.

The sheet feeder 160 includes one or more sheet containers 162 and a feed roller 164. Sheets are stacked in the sheet container 162. The feed roller 164 feeds the sheets, which are stacked on the sheet container 162. In order to load sheets that are larger than a certain size into the sheet container 162, the sheet feeder cover 110 is opened. When such sheets are loaded, rear ends of the sheets stick out of the image forming apparatus body 100, and the sticking-out portions of the sheets are supported by the sheet feeder cover 110 from below with respect to the direction of gravity.

The transport path 180 transports the sheets from the sheet feeder 160 to the transfer device 130 and further transports the sheets toward to the output unit 600. Along the transport path 180, the feed roller 164, transport rollers 182, registration rollers 184, the transfer device 130, the fixing unit 140, and output rollers 186 are disposed from the upstream side in the sheet transport direction.

The transport rollers 182 transport the sheet toward the registration rollers 184. The registration rollers 184 temporarily stop movement of the leading edge of the sheet that is being transported toward the transfer device 130. Then, the registration rollers 184 restart the movement of the leading edge of the sheet toward the transfer device 130 so as to be in time with arrival of a developer image, which has been formed on the photoconductor drum 122, to the transfer device 130. The output rollers 186 transport the sheet, on which the developer image has been fixed by the fixing unit 140, toward the output unit 600.

The document reading device 300 includes a document reading device body 302, and is rotatably supported by the image forming apparatus body 100 by using a hinge 310. The document reading device 300 is openable/closable between an open position (illustrated in FIGS. 1 and 2) and a closed position (illustrated in FIG. 3) relative to the image forming apparatus body 100.

The dampers 500R and 500L each absorb shock that is generated due to rotation of the document reading device 300. The damper 500R is disposed in a right part of the image forming apparatus 10, and the damper 500L is disposed in a left part of the image forming apparatus body 100. Because the dampers 500R and 500L have the same structure, only the damper 500R will be described, and description of the damper 500L will be omitted. Hereinafter, the damper 500R may be referred to as the damper 500, unless it is necessary to distinguish the damper 500R from the damper 500L.

The damper 500 includes a guide member 510 and a damper body 530. The guide member 510 is used as a guide portion disposed on the document reading device 300. The damper body 530 includes an arm 534 and a coil spring 560. The arm 534 is disposed on the image forming apparatus body 100 and used as a member that is guided by the guide member 510. The coil spring 560 is used as an urging member that urges the arm 534.

Figure 4:
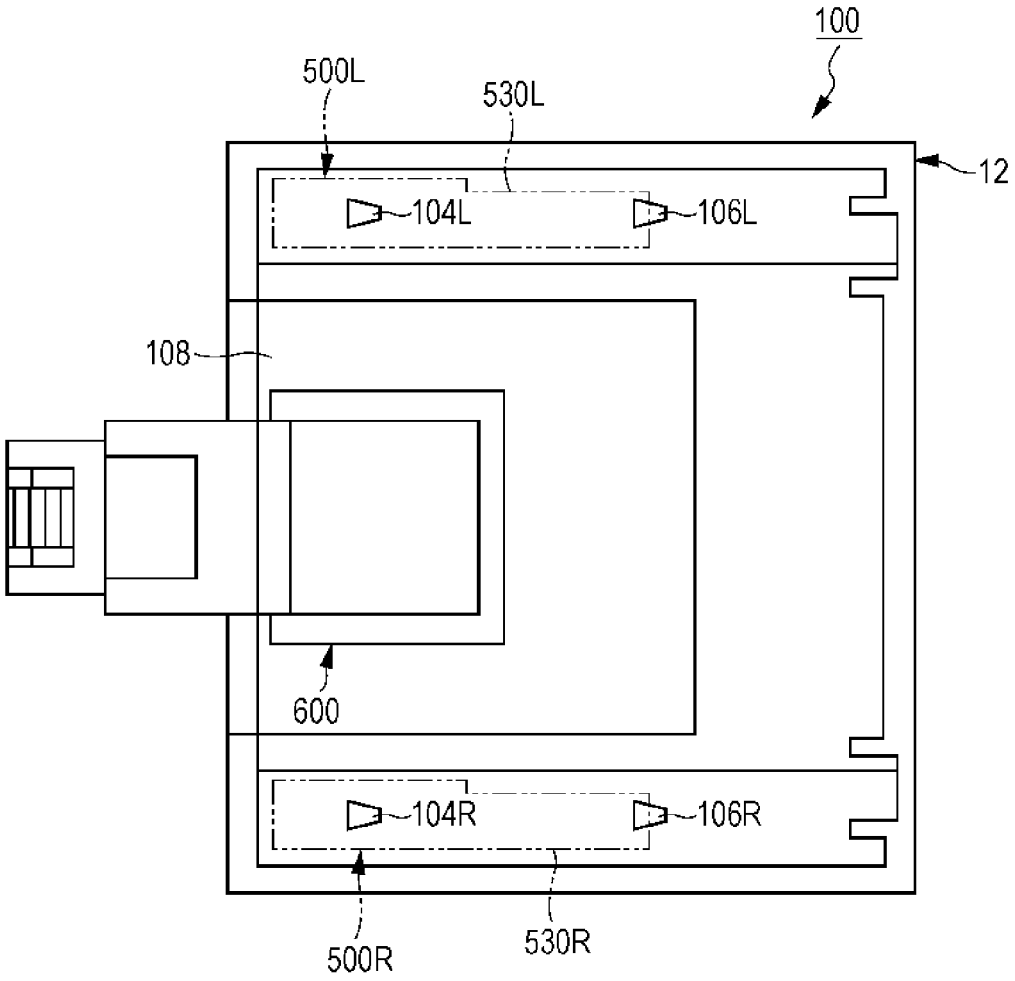
FIG. 4 is a plan view of an mage forming apparatus body of the image forming apparatus illustrated in FIG. 1.

FIG. 4 illustrates the image forming apparatus body 100. As illustrated in FIG. 4, attachment holes 104R and 106R are formed in the surface 108 on the upper side of the image forming apparatus body 100. The attachment holes 104R and 106R are used for attaching a damper body 530R of the damper 500R to the image forming apparatus body 100. Attachment holes 104L and 106L are formed in the upper surface of the image forming apparatus body 100. The attachment holes 104L and 106L are used for attaching a damper body 530L of the damper 500L to the image forming apparatus body 100. The attachment holes 104R and 104L are respectively disposed in a front part of the image forming apparatus body 100 as compared with the attachment holes 106R and 106L.

Figure 5:
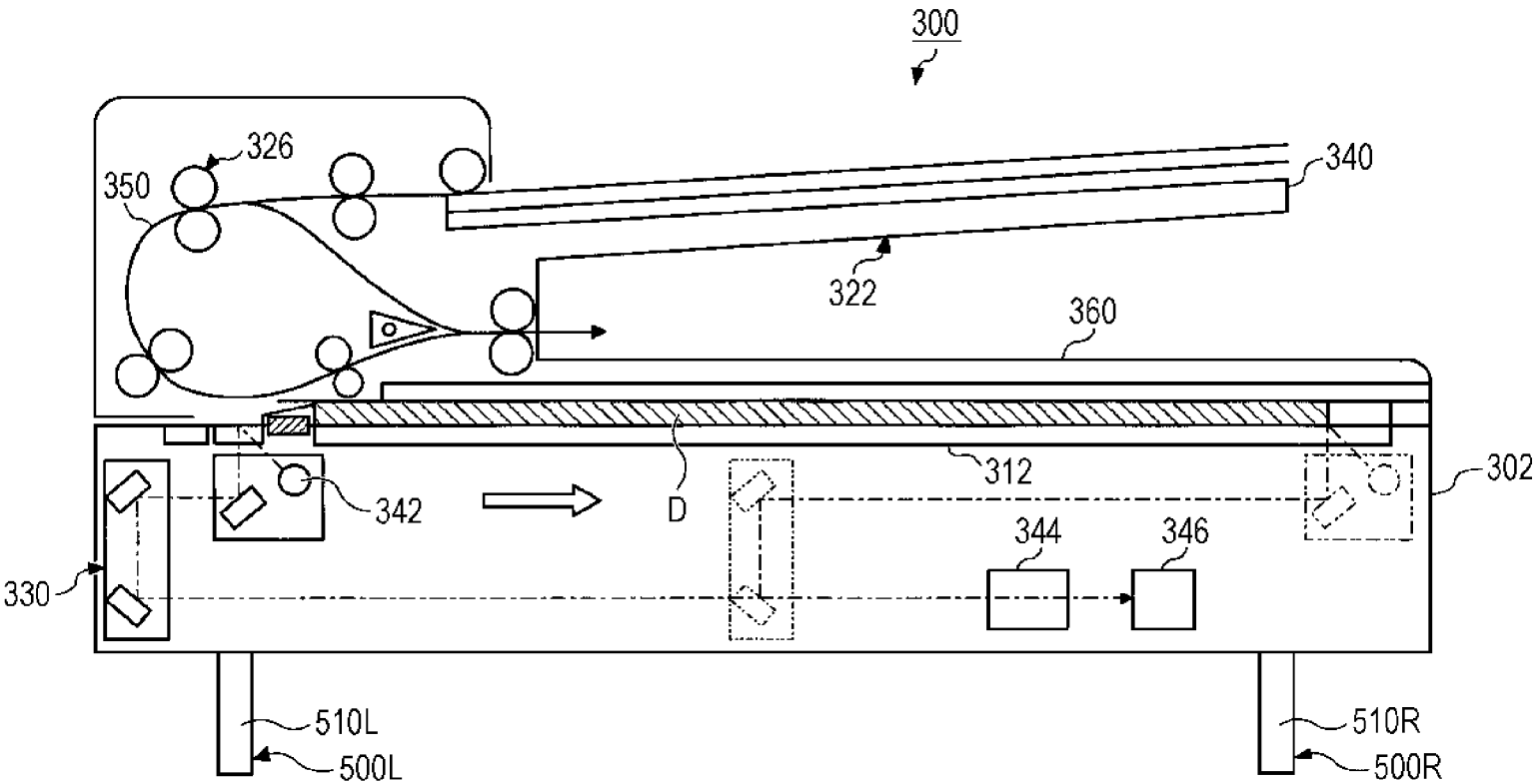
FIG. 5 is a sectional view of a document reading device of the image forming apparatus illustrated in FIG. 1 taken along line V-V of FIG. 3.
Figure 6:
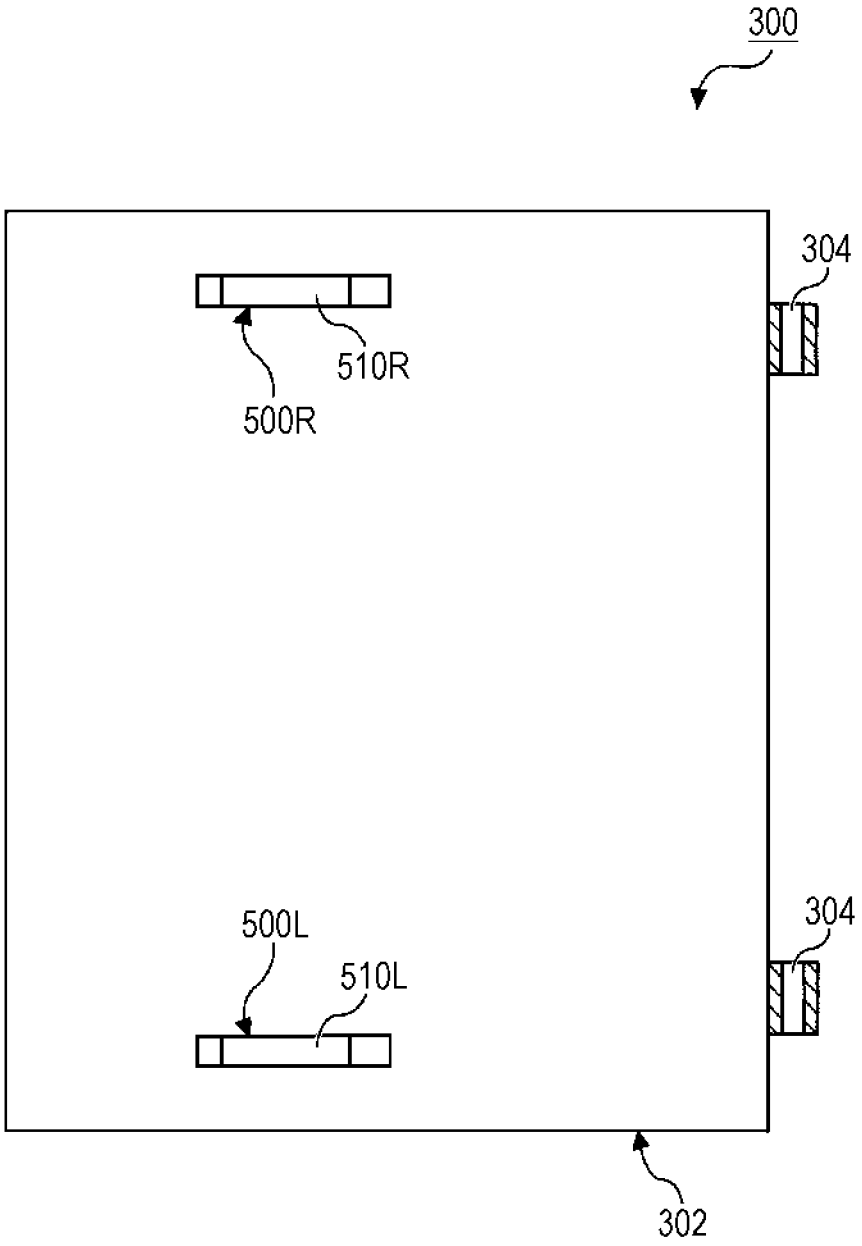
FIG. 6 is a sectional view of a document reading device illustrated in FIG. 5 taken along line VI-VI of FIG. 3.

FIGS. 5 and 6 illustrate the document reading device 300. The document reading device 300 includes the document reading device body 302 as described above. A guide member 510R of the damper 500R and a guide member 510L of the damper 500L are attached to the lower surface of the document reading device body 302. The document reading device body 302 includes attachment portions 304. The attachment portions 304 are attached to the image forming apparatus body 100 by using the hinge 310 (see FIGS. 2 and 3).

As illustrated in FIG. 5, the document reading device 300 includes a platen member 312 that is made of an optically transparent material. The platen member 312 is used as a document reading plate on which a document is placed. A platen cover 322 is attached to the document reading device body 302 so as to be openable/closable relative to the document reading device body 302.

A reading unit 330 is disposed in the document reading device body 302. The reading unit 330 irradiates the document with light, and reads the document on the basis of reflected light that is reflected from the document. A document transport device 326 is disposed in the platen cover 322. The document transport device 326 automatically transports a document D. The document reading device 300 has a function of reading the document D that is being transported by the document transport device 326 and a function of reading the document D that is placed on the platen member 312.

The document transport device 326 includes a document tray 340, a document transport path 350, and an output tray 360. The document D to be read is set on the document tray 340. The document transport path 350 transports the document D. After an image on the document D has been read, the document D is output to the output tray 360.

The reading unit 330 includes a light source 342, a lens 344, and a photoelectric conversion element 346. The light source 342 irradiates a document with light, and reflected light reflected by the document is collected by the lens 344, and the collected light is received by the photoelectric conversion element 346, which converts the light to a signal.

Figure 7:
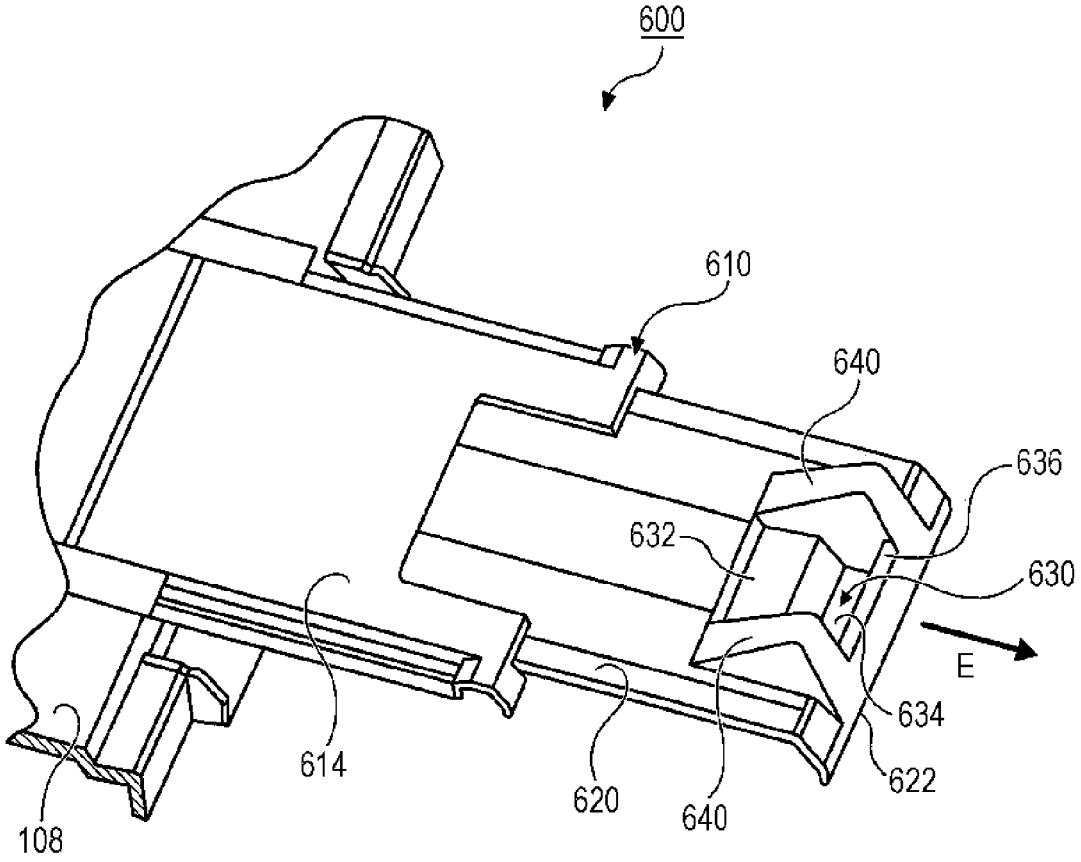
FIG. 7 is a perspective view of an output unit of the image forming apparatus illustrated in FIG. 1.

FIG. 7 illustrates the output unit 600. The output unit 600 includes the surface 108 and the extension portion 610. The surface 108 is the upper surface of the image forming apparatus body 100 that is used as the output unit body. The extension portion 610 is disposed on the surface 108 so as to be extendable from the surface 108 in the sheet output direction indicated by an arrow E in FIG. 7. The extension portion 610 includes a first extension member 614 and a second extension member 620. The first extension member 614 is extendable from the surface 108 in the sheet output direction. The second extension member 620 is extendable from the first extension member 614 in the sheet output direction. After an image is formed on a sheet, the extension portion 610 supports a portion of the sheet, which protrudes from an edge of the surface 108, from below with respect to the direction of gravity.

A handle portion 630 is formed in the second extension member 620 of the extension portion 610. The handle portion 630 is recessed in a direction away from the back surface (the lower surface) of a sheet so as to allow a finger to be inserted into the handle portion 630 in a direction in which the extension portion 610 is extended in the sheet output direction. Moreover, the extension portion 610 includes two protrusions 640 that protrude toward the back surface of a sheet. As illustrated in FIG. 7, the handle portion 630 is disposed between the two protrusions 640.

The handle portion 630 includes a first recess 632, a second recess 634, and a wall 636. The first recess 632 is recessed in a direction away from the back surface of the sheet. The second recess 634 is disposed downstream of the first recess 632 in the sheet output direction and in a direction in which the extension portion 610 is extended with respect to the first recess 632. The second recess 634 has a depth larger than that of the first recess 632. The wall 636 is disposed downstream of the second recess 634 in the sheet output direction and that is in a direction in which the extension portion 610 is extended with respect to the second recess 634. The wall 636 extends in a direction that intersects the sheet output direction.

Figure 8A:
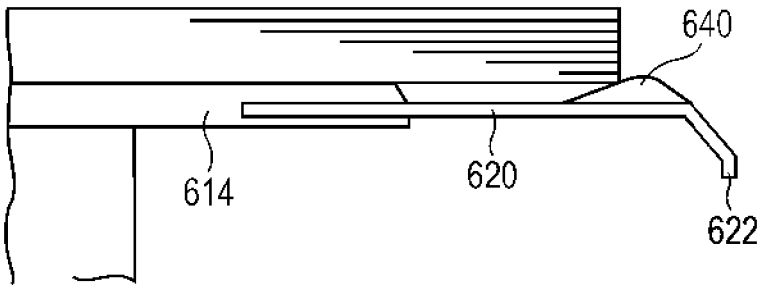
Figure 8B:
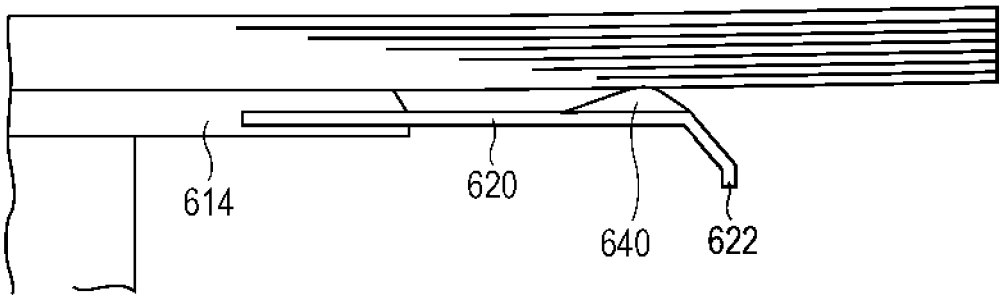

FIG. 8A illustrates how the output unit 600 supports sheets when the downstream ends of the sheets in the sheet output direction are on the upstream side of an end 622 of the extension portion 610 with respect to the sheet output direction. FIG. 8B is a left side view illustrating how the output unit 600 supports sheets when the downstream ends of the sheets in the sheet output direction are on the downstream side of the end 622 of the extension portion 610 in the sheet output direction. In this way, the extension portion 610 may support sheets when the downstream ends of the sheets in the sheet output direction are on the upstream side of the end 622 of the extension portion 610 with respect to the sheet output direction, or the output unit 600 may support sheets when the downstream ends of the sheets in the sheet output direction are on the downstream side of the end 622 of the extension portion 610 in the sheet output direction.

FIG. 8B illustrates the case where the extension portion 610 supports sheets when the downstream ends of the sheets in the sheet output direction are on the upstream side of the end 622 of the extension portion 610 with respect to the sheet output direction. In this case, a part of the sheets between a part that is supported from below by one of the protrusions 640 and a part that is supported from below by the other of the protrusions falls into the handle portion 630, so that the sheets become curved and thereby rigidity is generated in the sheets. Therefore, it is unlikely that the leading ends of the sheets in the output direction droop.

The extension portion 610 is extended when it is used and contracted when it is not used. In order to extend the extension portion 610, a user inserts his/her finger in the handle portion 630 and pulls out the extension portion 610 forward, so that the first extension member 614 is extended from the surface 108 and the second extension member 620 is extended from the first extension member 614. Thus, in the present exemplary embodiment, although the extension portion 610 has plural extendable portions, the plural portions are extended with one operation and thereby the extension portion 610 is pulled out forward. As compared with a case where the extension portion is extendable so as to be rotated above the surface 108, the extension portion is allowed to be pulled out and extended even if the output space (a gap between the surface 108 and the lower surface of the document reading device body 302) is small, whereby the height of the apparatus may be small.

In the present exemplary embodiment, when sheets have been output onto the output unit, the two protrusions 640 support the sheets, so that a space is formed between the handle portion 630 and the sheets. Therefore, a user extends the extension portion 610 without removing the sheets from the output unit by inserting his/her finger into the space and pulling out the handle portion 630.

In the exemplary embodiment, when a finger is inserted into the handle portion 630, the tip of the finger is guided from the first recess 632, to the second recess 634, and to the wall 636. The second recess 634 is disposed in the direction in which the extension portion 610 is extended with respect to the first recess 632 and has a depth larger than that of the first recess 632. The wall 636 is disposed in the direction in which the extension portion 610 is extended with respect to the second recess 634. Therefore, a user need not feel for the position of the wall 636 because the fingertip is naturally guided to the wall 636.

Figure 9:
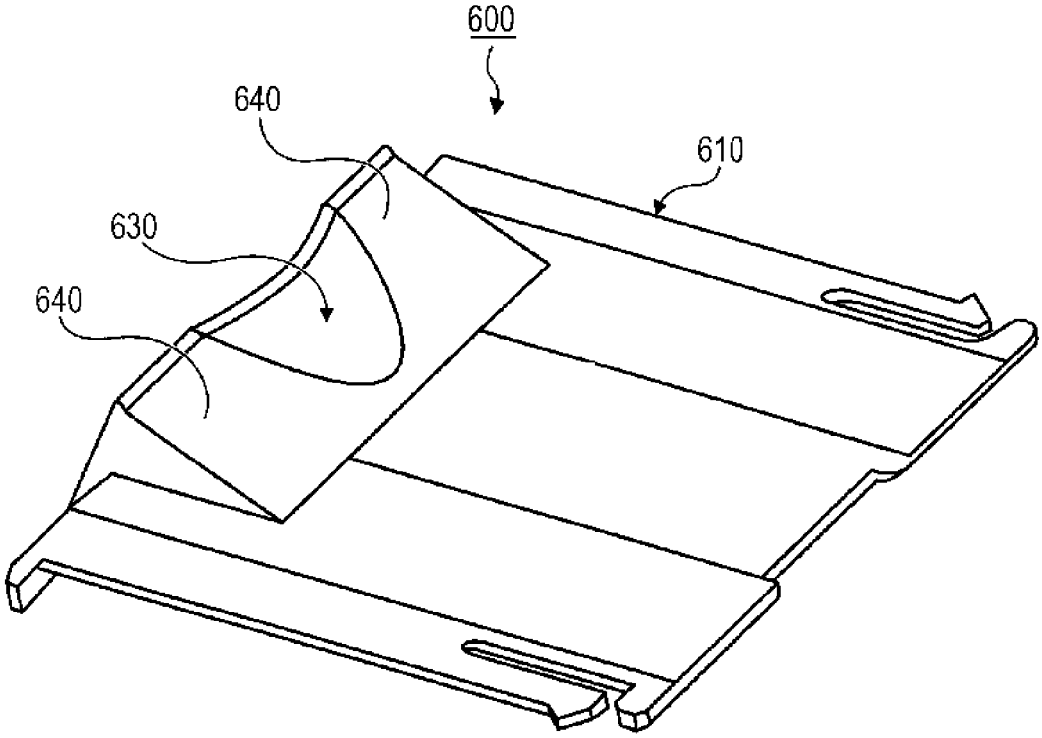
FIG. 9 is a perspective view of a modification of an output unit of the image forming apparatus illustrated in FIG. 1.

FIG. 9 illustrates a modification of the output unit 600. In the output unit 600 of the image forming apparatus 10 according to the exemplary embodiment of the present invention, the handle portion 630 is formed by a combination of flat surfaces. In contrast, the handle portion 630 of the modification is formed by curved surfaces. In other respects, the output unit 600 of the modification is the same as that of the image forming apparatus 10 according to the exemplary embodiment of the present invention, so that description of such respects is omitted.

As heretofore described, the present invention is applicable to an image forming apparatus, such as a copier, a facsimile machine, or a printer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

[1. An image forming apparatus comprising:

an output unit to which a recording medium on which an image has been formed is output, the output unit including an output unit body which receives the output recording medium on which the image has been formed, and an extension portion that is disposed on the output unit body so as to be extendable from the output unit body in an output direction of the recording medium, the extension portion including a handle portion that is recessed in a direction away from a back surface of the recording medium so as allow a finger to be hooked in a direction in which the extension portion is extended in the output direction of the recording medium, the back surface being a surface that is in contact with the output unit body, and at least one protrusion that protrudes toward the back surface of the recording medium from the extension portion, wherein the handle portion includes:

a first recess that is recessed in a direction away from the back surface the recording medium along the output direction of the recording medium, a second recess that is disposed downstream of the first recess in the output direction of the recording medium, the second recess having a depth larger than a depth of the first recess, and a wall that is disposed downstream of the second recess in the output direction of the recording medium, the wall extending in a direction that intersects the output direction of the recording medium.]

[2. The image forming apparatus according to claim 1, wherein the at least one protrusion comprises two protrusions, and wherein the handle portion is disposed between the two protrusions.]

[3. The image forming apparatus according to claim 1, wherein the extension portion comprises a first extension member extendable from the output unit body in the output direction of the recording medium, and a second extension portion extendable from the first extension member in the output direction of the recording medium.]

[4. The image forming apparatus according to claim 1, wherein the depth of the first recess is greater than a depth of a top surface of the extension portion, the top surface of the extension portion being a surface that faces the back surface of the recording medium.]

[5. The image forming apparatus according to claim 1, wherein the extension portion further includes an end that is downstream of the wall in the output direction of the recording medium, the end having a depth larger than the depth of the second recess.]

[6. The image forming apparatus according to claim 1, wherein the at least one protrusion is located at an inside of the extension portion away from lateral edges of the extension portion.]

[7. An output unit to which a recording medium on which an image has been formed is output, the output unit comprising:

an output unit body which receives the output recording medium on which the image has been formed; and an extension portion that is disposed on the output unit body so as to be extendable from the output unit body in an output direction of the recording medium, the extension portion including a handle portion that is recessed in a direction away from a back surface of the recording medium so as allow a finger to be hooked in a direction in which the extension portion is extended in the output direction of the recording medium, the back surface being a surface that faces the output unit body, and at least one protrusion that protrudes toward the back surface of the recording medium from the extension portion, wherein the handle portion includes:

a first recess that is recessed in a direction away from the back surface the recording medium along the output direction of the recording medium, a second recess that is disposed downstream of the first recess in the output direction of the recording medium, the second recess having a depth larger than a depth of the first recess, and a wall that is disposed downstream of the second recess in the output direction of the recording medium, the wall extending in a direction that intersects the output direction of the recording medium.]

[8. The output unit according to claim 7, wherein the at least one protrusion comprises two protrusions, and wherein the handle portion is disposed between the two protrusions.]

[9. An image forming apparatus comprising:

a tray unit on which a recording medium is deposited, the tray unit including a tray unit body, and an extension portion that is disposed in the tray unit body from which the extension portion is drawn out in a drawing out direction away from a main body of the image forming apparatus, the extension portion including a protrusion that protrudes from the upper surface of the extension portion, a handle portion that is recessed from an upper surface of the extension portion without penetrating through the extension portion, the handle portion having a side wall extending in the drawing out direction, wherein at least a portion of the side wall is formed by at least a portion of the protrusion.]

*10. An image forming apparatus comprising:*

*a tray unit body;*

*an extension portion that can be drawn out from the tray unit body;*

*a recessed portion recessed from a planar portion of an upper surface of the extension portion;*

*a wall portion located on an upstream side in an output direction of the recording medium from the recessed portion; and*

*an upstream recessed portion, upstream of the recessed portion in the output direction of the recording medium, and recessed from the planar portion of the upper surface of the extension portion,*

*wherein the recessed portion, the wall portion, and the upstream recessed portion are fixedly provided on the extension portion.*

*11. The image forming apparatus according to claim 10, wherein the upstream recessed portion is upstream of the wall portion.*

*12. The image forming apparatus according to claim 10, wherein the recessed portion has a greater depth relative to the upper surface of the extension portion than the upstream recessed portion.*

*13. An image forming apparatus comprising:*

*a tray unit body;*

*an extension portion that can be drawn out from the tray unit body;*

*a recessed portion recessed from a planar portion of an upper surface of the extension portion;*

*a wall portion located on an upstream side in an output direction of the recording medium from the recessed portion;*

*an upstream recessed portion, upstream of the recessed portion in the output direction of the recording medium, and recessed from the planar portion of the upper surface of the extension portion; and*

*a downstream wall portion, downstream from the wall portion and the recessed portion in the output direction of the recording medium, and projecting toward a surface of the recording medium,*

*wherein the recessed portion, the wall portion, and the upstream recessed portion are fixedly provided on the extension portion.*

* * * * *